No. 804,398. PATENTED NOV. 14, 1905.
J. A. HALL.
SAWING STONE.
APPLICATION FILED AUG. 18, 1904.
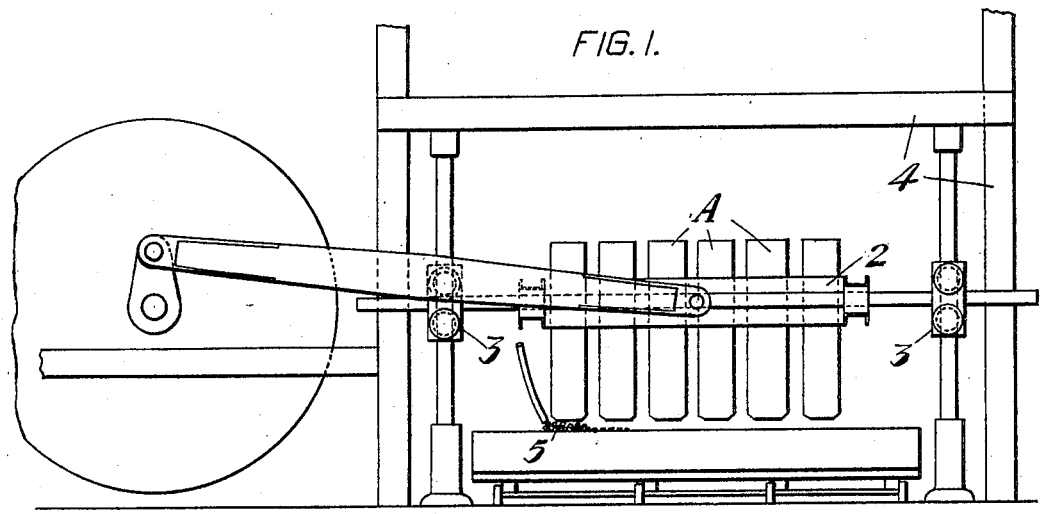
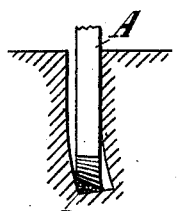
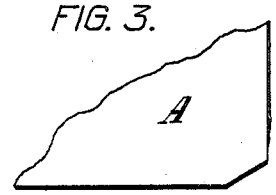
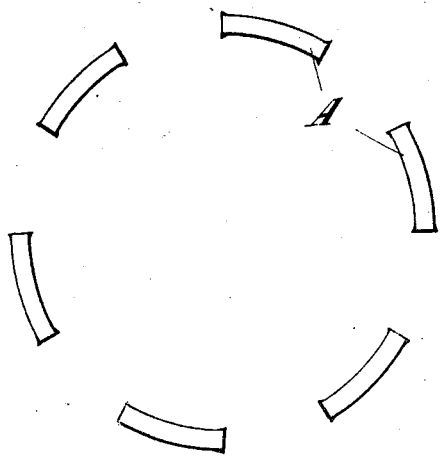
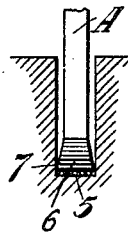
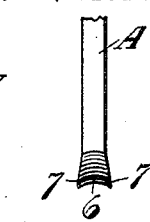
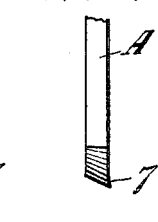
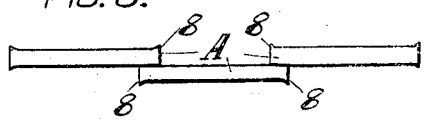
WITNESSES,
Chas. E. Chapin.
INVENTOR,
John A. Hall
By Geo. H. Strong
Atty

UNITED STATES PATENT OFFICE.

JOHN A. HALL, OF SACRAMENTO, CALIFORNIA, ASSIGNOR TO V. S. McCLATCHY, TRUSTEE, OF SACRAMENTO, CALIFORNIA.

SAWING STONE.

No. 804,398.  Specification of Letters Patent.  Patented Nov. 14, 1905.

Application filed August 18, 1904. Serial No. 221,220.

*To all whom it may concern:*

Be it known that I, JOHN A. HALL, a citizen of the United States, residing at Sacramento, in the county of Sacramento and State of California, have invented new and useful Improvements in Sawing Stone, of which the following is a specification.

My invention relates to improvements in sawing stone. It is usual to employ in this sort of work a saw having an oscillating or reciprocating carriage in which are clamped a series of saw-blades comprising each a rectangular iron or steel plate about one-quarter inch by twelve inches by five or six feet. The carriage is operated to cause the lower ends of the plates to impinge upon the stone in the line of the desired cut, the actual cutting being done by small chilled iron balls or "shot," as they are called. These shot are finer than ordinary bird-shot, being about one sixty-fourth of an inch, more or less, in diameter. They get under the blades and by their constant scratching wear away the relatively softer stone. Heretofore considerable difficulty has been experienced where sawing by this method is practiced in keeping the shot always under the blades and preventing their working to one side or the other of the proper plane of the cut to cause an undesired "drifting" of the saw. This difficulty arises by virtue of the corners of the blades becoming worn very thin and tapered and convexed, so as to present more or less of a wedge or knife-edge to the shot.

The primary object of my invention is to obviate this tendency of the saw to drift from its correct course.

The nature of my invention will be more fully described hereinafter, having reference to the accompanying drawings, in which—

Figure 1 is a side elevation of a stone-sawing machine. Fig. 2 is a view showing method of straightening cut. Fig. 3 is a side view of corner of a blade. Fig. 4 is a plan view of saw for making circular cut, showing application of the invention. Figs. 5, 6, 7 show different ways of upsetting corner. Fig. 8 shows saw composed of overlapping blades, to which my method is also applicable.

A represents a saw-blade of usual construction made of iron or steel and preferably rectangular in shape, being about one-fourth of an inch thick by twelve inches wide and perhaps five or six feet long. A series of these blades are clamped in a suitable carriage 2, reciprocal in guides 3 of frame 4 and operated from any convenient source of power.

To cut a stone, a quantity of shot, as indicated at 5, is constantly fed into the path of the saw-blades. The rubbing back and forth of the shot on the stone beneath the blades wears away the stone in a groove, which gradually deepens into a well-defined cut and eventually extends through the stone. After a few hours of operation the corners of the blades become rounded and beveled, and instead of the shot working squarely under a blade they glance off to one side or the other and either bind the saw so as to make it work very hard or start to cutting to one side, causing the saw to drift in that direction. I have discovered that by occasionally upsetting or flattening the corners of the blades it is possible not only so to control the cut and entirely overcome drift, but the shot can be made to feed centrally beneath the blades and to receive the full pressure of the saw and frame, thereby greatly increasing the speed of the cut and the efficiency of the saw. This upsetting may be done by a few judiciously-administered blows with a hammer to broaden and flare the corners of the blades and to substitute a flat or concaved inclined surface and blunted edge for the previously rounded or convexed glancing corner. Where the cut is to be maintained perfectly straight, the corners of the blades are upset, as shown in Fig. 5, so that the blades at those points are slightly thickened on each side, and the surface 6 of an upset portion will be approximately at right angles to the plane of the blade and will gradually slope down to the under edge of the blade. The effect is for the blade as it strikes the shot lying in its path in the cut to ride up more or less onto the shot, pressing them down and under and carrying them along in its course and scouring and scratching the stone. As the saw moves in the opposite direction some of the shot which naturally get to the sides of the bottom of the blade strike the wing portions 7 of the upset corners and being jammed between the stone sides of the cut and the blade tend to compress the wings, gradually giving the surface 6 a more contracted and concaved appearance, as indicated in Fig. 6. This concavity is equally desirable with the original plane surface when the corner is first upset, since it acts as a central conductor and guide for the shot to and under the plate. After a time the wings become entirely worn away and the concavity disappears, whereupon the saw is stopped for a moment till the corners of the blades are given a few blows with a hammer to upset them in the fashion described. Of course any other suitable means may be employed to give a blade this blunted square-corner appearance. I have found that the upsetting could be satisfactorily done by means of a hammer and that it takes but a very short time to do it by such means. The difference in result between a saw having these square or concaved corners and one operating with sharp tapered and rounded corners is most noticeable. Not only is the cut maintained straight and the stone saved from possible serious injury by irregular cutting, but the cutting proceeds in some instances at the rate of twelve inches an hour, as compared with not over four inches an hour by the old method. Again, in case by rounding of the corners or from other causes the saw has started to drift to one side or the other it may be quickly directed back again into the proper plane by flattening or concaving that side of the corner of the saw away from the side toward which drift is taking place. Thus if drift is proceeding to the right it signifies that the shot is being directed to the right of the blade. By flattening or concaving the side of the corner on the left the shot is directed to the left and cutting then proceeds to the left. Just as soon as the saw has regained its proper plane the corners are then concaved or flattened, so that the shot will be fed neither to right nor left, but centrally beneath the blades. It is to be understood that I consider concaving an edge or corner equivalent to flattening it, the object and result in either case being practically the same. This same principle of regulating the feed of or directing the shot relative to the path of movement of the saw is applicable to saws of different types. For instance, in Fig. 8 is shown a saw-blade composed of a plurality of overlapping plates. The normal tendency of the saw is for the corners 8 to become worn and beveled, so that the shot is deflected to one side or the other of the saw with the undesired tendencies previously noted. By keeping these corners square or concaved these objections are obviated. Likewise in case of rotary saws, as in Fig. 4, the normal tendency is for the corners of the blades to wear more on one side than on the other and to make a conical cut flared or more contracted at the bottom, according to the drift of the shot. By squaring the corners from time to time a perfect cylinder may be cut.

By providing a saw-blade with upset corners, as hereinbefore described, not only is a relatively flat extended inclined surface presented to the shot to prevent the saw-blade from wearing thin, but the shot is pressed down hard where the end of the blade comes against it, with a tendency for the blade to roll up on the shot and maintain its thickened and upset character.

This upsetting process is just as essential to the success of the stone-saw as the swaging of a circular saw in a lumber-mill or the setting of an ordinary wood-saw.

Having thus described my invention, what I claim, and desire to secure by Letters Patent, is—

1. In the art of stone-sawing employing a saw-blade and shot as the cutting agent, the step of directing said shot relative to the path of movement of the saw said step consisting in upsetting the working edges of the saw transversely beyond the plane of the sides of the saw to form a surface that will deflect the shot in the desired direction.

2. In the art of stone-sawing employing a saw-blade and shot as the cutting agent, the step of controlling the direction of cut by the shot said step consisting in expanding laterally and shaping the working corners of the blade so that the expanded and shaped portion will deflect the shot in its path, in the direction of the desired cut.

3. In the art of stone-sawing employing a blade and loose shot as the cutting agent, the step of controlling the direction of cut by said shot, said step consisting in flattening the corner of the blade to increase the diameter of the blade at that point.

4. In the art of stone-sawing employing a blade and loose shot as the cutting agent, the step of controlling the direction of cut by the shot said step consisting in flattening and flaring the corner of the blade until its side edges extend transversely beyond the plane of the sides of the blade to cause the shot to impinge upon the stone in the direction of the desired cut.

5. In the art of stone-sawing employing a blade and shot as the cutting agent, the step of controlling the direction of cut by the shot said step consisting in increasing the transverse diameter of and squaring the corner of the blade to present a relatively extended flat surface to the shot.

In testimony whereof I have hereunto set my hand in presence of two subscribing witnesses.

JOHN A. HALL.

Witnesses:
H. H. JOHNSON,
E. B. HARLAN.